United States Patent
Subramania et al.

(10) Patent No.: US 8,150,172 B2
(45) Date of Patent: Apr. 3, 2012

(54) VIDEO CODING MODE SELECTION USING ESTIMATED CODING COSTS

(75) Inventors: Sitaraman Ganapathy Subramania, San Diego, CA (US); Fang Shi, San Diego, CA (US); Peisong Chen, San Diego, CA (US); Seyfullah Halit Oguz, San Diego, CA (US); Scott T. Swazey, San Diego, CA (US); Vinod Kaushik, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 1046 days.

(21) Appl. No.: 11/744,762

(22) Filed: May 4, 2007

(65) Prior Publication Data

US 2008/0273810 A1 Nov. 6, 2008

(51) Int. Cl.
*G06K 9/36* (2006.01)
*G06K 9/46* (2006.01)
*G06K 9/00* (2006.01)

(52) U.S. Cl. ......... 382/232; 382/239; 382/248; 382/251
(58) Field of Classification Search .................. 382/232, 382/239, 248, 251
See application file for complete search history.

(56) References Cited

U.S. PATENT DOCUMENTS

2006/0018552 A1* 1/2006 Malayath et al. ............. 382/232
2007/0053426 A1 3/2007 Lee et al.
2008/0243971 A1* 10/2008 Po et al. ............................. 708/4

FOREIGN PATENT DOCUMENTS

KR 20070027422 A 3/2007

OTHER PUBLICATIONS

Tu, Yu-K.—"Efficient rate-distortion estimation for H.264/AVC coders"—May 1, 2006, IEEE, pp. 600-611.*
Judice, C.—"Digital Video: A buffer-controlled dither processor for animated images"—IEEE—1977—pp. 1433-1440.*
Chen Q et al: "A fast bits estimation method for rate-distortion optimization in H.264/AVC" Proceedings of the Picture Coding Symposium, Dec. 15, 2004, pp. 133-137, XP002348992.
Qiang Wang et al: "Low Complexity RDO Mode Decision based on a Fast Coding-Bits Estimation Model for H.264/AVC" Circuits and Systems, 2005. ISCAS 2005. IEEE International Symposium on Kobe, Japan May 23-26, 2005, Piscataway, NJ, USA, IEEE, May 23, 2005, pp. 3467-3470, XP010816271.
International Search Report—PCT/US2007/068307, International Search Authority—European Patent Office—Apr. 2, 2008.

(Continued)

*Primary Examiner* — Bernard Krasnic
(74) *Attorney, Agent, or Firm* — Stanton Braden

(57) ABSTRACT

A method and system for coding mode selection using estimated coding costs. To provide high compression efficiency, for example, an encoding device may attempt to select a coding mode for coding blocks of pixels that codes the data of the blocks with high efficiency. To this end, the encoding device may perform coding mode selection based on estimates of coding cost for at least a portion of the possible modes. The encoding device may estimate the coding cost for the different modes without actually coding the blocks. In fact, in some aspects, the encoding module device may estimate the coding cost for the modes without quantizing the data of the block for each mode. In this manner, the coding cost estimation techniques may reduce the amount of computationally intensive calculations needed to perform effective mode selection.

32 Claims, 6 Drawing Sheets

OTHER PUBLICATIONS

Written Opinion—PCT/US2007/068307, International Search Authority—European Patent Office—Apr. 2, 2008.

Jianwen Chen et al., "A Fast Mode Decision Algorithm in H.264", State Key Lab on Microwave & Digital Communications, Department of Electronics Engineering, Tsinghua University, Beijing, China, 100084, 4 pages.

Quqing Chen et al., "A Fast Bits Method for Rate-Distortion Optimization in H.264/AVC", State Key Lab on Microwave & Digital Communications, Department of Electronics Engineering, Tsinghua University, Beijing, China, 100084, 5 pages.

Translation of Office Action in Korean application 10-2009-7025315 corresponding to U.S. Appl. No. 11/744,762, citing KR20070027422 dated Apr. 13, 2011.

* cited by examiner

VIDEO CODING MODE SELECTION USING ESTIMATED CODING COSTS

TECHNICAL FIELD

The disclosure relates to video coding and, more particularly, to estimating coding costs to code video sequences.

BACKGROUND

Digital video capabilities can be incorporated into a wide range of devices, including digital televisions, digital direct broadcast systems, wireless communication devices, personal digital assistants (PDAs), laptop computers, desktop computers, video game consoles, digital cameras, digital recording devices, cellular or satellite radio telephones, and the like. Digital video devices can provide significant improvements over conventional analog video systems in processing and transmitting video sequences.

Different video coding standards have been established for coding digital video sequences. The Moving Picture Experts Group (MPEG), for example, has developed a number of standards including MPEG-1, MPEG-2 and MPEG-4. Other examples include the International Telecommunication Union (ITU)-T H.263 standard, and the ITU-T H.264 standard and its counterpart, ISO/IEC MPEG-4, Part 10, i.e., Advanced Video Coding (AVC). These video coding standards support improved transmission efficiency of video sequences by coding data in a compressed manner.

Many current techniques make use of block-based coding. In block-based coding, frames of a multimedia sequence are divided into discrete blocks of pixels, and the blocks of pixels are coded based on differences with other blocks, which may be located within the same frame or in a different frame. Some blocks of pixels, often referred to as "macroblocks," comprise a grouping of sub-blocks of pixels. As an example, a 16×16 macroblock may comprise four 8×8 sub-blocks. The sub-blocks may be coded separately. For example, the H.264 standard permits coding of blocks with a variety of different sizes, e.g., 16×16, 16×8, 8×16, 8×8, 4×4, 8×4, and 4×8. Further, by extension, sub-blocks of any size may be included within a macroblock, e.g., 2×16, 16×2, 2×2, 4×16, and 8×2.

SUMMARY

In certain aspects of this disclosure, a method for processing digital video data comprises identifying one or more transform coefficients for residual data of a block of pixels that will remain non-zero when quantized, estimating a number of bits associated with coding of the residual data based on at least the identified transform coefficients, and estimating a coding cost for coding the block of pixels based on at least the estimated number of bits associated with coding the residual data.

In certain aspects, an apparatus for processing digital video data comprises a transform module that generates transform coefficients for residual data of a block of pixels, a bit estimate module that identifies one or more of the transform coefficients that will remain non-zero when quantized and estimates a number of bits associated with coding of the residual data based on at least the identified transform coefficients, and a control module that estimates a coding cost for coding the block of pixels based on at least the estimated number of bits associated with coding the residual data.

In certain aspects, an apparatus for processing digital video data comprises means for identifying one or more transform coefficients for residual data of a block of pixels that will remain non-zero when quantized, means for estimating a number of bits associated with coding of the residual data based on at least the identified transform coefficients, means for estimating a coding cost for coding the block of pixels based on at least the estimated number of bits associated with coding the residual data.

In certain aspects, a computer-program product for processing digital video data comprises a computer readable medium having instructions thereon. The instructions include code for identifying one or more transform coefficients for residual data of a block of pixels that will remain non-zero when quantized, code for estimating a number of bits associated with coding of the residual data based on at least the identified transform coefficients, and code for estimating a coding cost for coding the block of pixels based on at least the estimated number of bits associated with coding the residual data.

The details of one or more examples are set forth in the accompanying drawings and the description below. Other features, objects, and advantages will be apparent from the description and drawings, and from the claims.

DETAILED DESCRIPTION

This disclosure describes techniques for video coding mode selection using estimated coding costs. To provide high compression efficiency, for example, an encoding device may attempt to select a coding mode for coding blocks of pixels that codes the data of the blocks with high efficiency. To this end, the encoding device may perform coding mode selection based on at least estimates of coding cost for at least a portion of the possible modes. In accordance with the techniques described herein, the encoding device estimates the coding cost for the different modes without actually coding the blocks. In fact, in some aspects, the encoding module device may estimate the coding cost for the modes without quantizing the data of the block for each mode. In this manner, the coding cost estimation techniques of this disclosure reduce the amount of computationally intensive calculations needed to perform effective mode selection.

Figure 1:
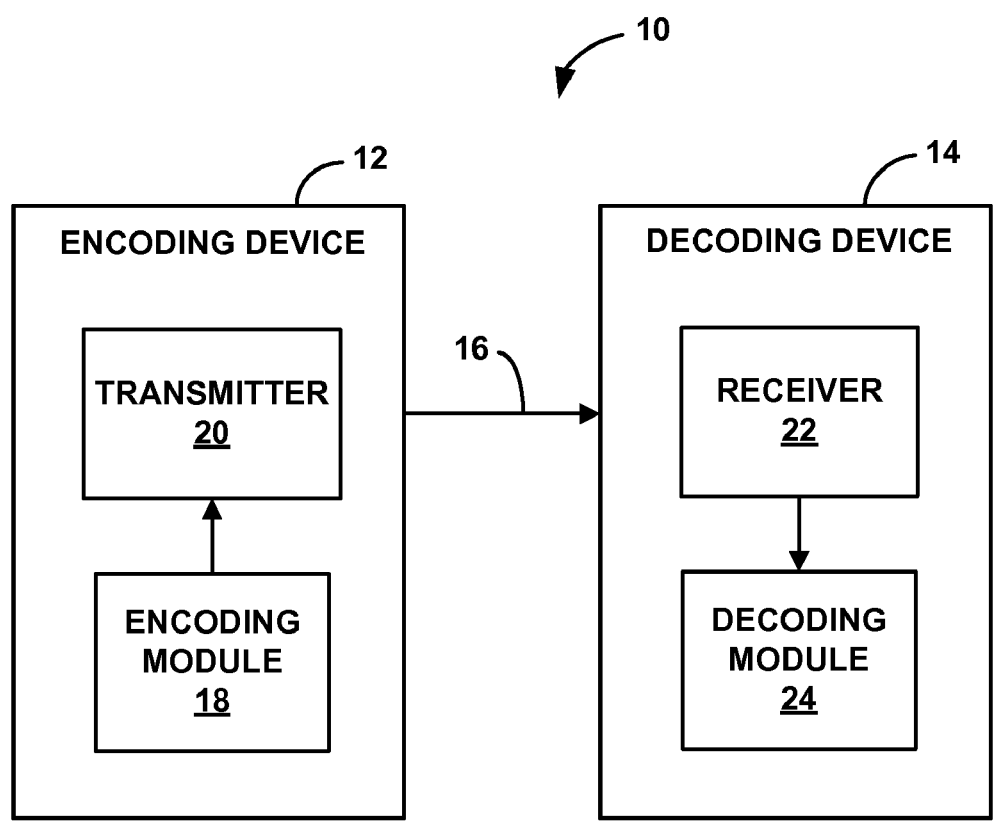
FIG. 1 is a block diagram illustrating a video coding system that employs the coding cost estimate techniques described herein.

FIG. 1 is a block diagram illustrating a multimedia coding system 10 that employs coding cost estimate techniques as described herein. Coding system 10 includes an encoding device 12 and a decoding device 14 connected by a transmission channel 16. Encoding device 12 encodes one or more sequences of digital multimedia data and transmits the encoded sequences over transmission channel 16 to decoding device 14 for decoding and, possibly, presentation to a user of decoding device 14. Transmission channel 16 may comprise any wired or wireless medium, or a combination thereof.

Encoding device 12 may form part of a broadcast network component used to broadcast one or more channels of multimedia data. As an example, encoding device 12 may form part of a wireless base station, server, or any infrastructure node that is used to broadcast one or more channels of encoded multimedia data to wireless devices. In this case, encoding device 12 may transmit the encoded data to a plurality of wireless devices, such as decoding device 14. A single decoding device 14, however, is illustrated in FIG. 1 for simplicity. Alternatively, encoding device 12 may comprise a handset that transmits locally captured video for video telephony or other similar applications.

Decoding device 14 may comprise a user device that receives the encoded multimedia data transmitted by encoding device 12 and decodes the multimedia data for presentation to a user. By way of example, decoding device 14 may be implemented as part of a digital television, a wireless communication device, a gaming device, a portable digital assistant (PDA), a laptop computer or desktop computer, a digital music and video device, such as those sold under the trademark "iPod," or a radiotelephone such as cellular, satellite or terrestrial-based radiotelephone, or other wireless mobile terminal equipped for video and/or audio streaming, video telephony, or both. Decoding device 14 may be associated with a mobile or stationary device. In a broadcast application, encoding device 12 may transmit encoded video and/or audio to multiple decoding devices 14 associated with multiple users.

In some aspects, for two-way communication applications, multimedia coding system 10 may support video telephony or video streaming according to the Session Initiated Protocol (SIP), International Telecommunication Union Standardization Sector (ITU-T) H.323 standard, ITU-T H.324 standard, or other standards. For one-way or two-way communication, encoding device 12 may generate encoded multimedia data according to a video compression standard, such as Moving Picture Experts Group (MPEG)-2, MPEG-4, ITU-T H.263, or ITU-T H.264, which corresponds to MPEG-4, Part 10, Advanced Video Coding (AVC). Although not shown in FIG. 1, encoding device 12 and decoding device 14 may be integrated with an audio encoder and decoder, respectively, and include appropriate multiplexer-demultiplexer (MUX-DE-MUX) modules, or other hardware, firmware, or software, to handle encoding of both audio and video in a common data sequence or separate data sequences. If applicable, MUX-DEMUX modules may conform to the ITU H.223 multiplexer protocol, or other protocols such as the user datagram protocol (UDP).

In certain aspects, this disclosure contemplates application to Enhanced H.264 video coding for delivering real-time multimedia services in terrestrial mobile multimedia multicast (TM3) systems using the Forward Link Only (FLO) Air Interface Specification, "Forward Link Only Air Interface Specification for Terrestrial Mobile Multimedia Multicast," published as Technical Standard TIA-1099, August 2006 (the "FLO Specification"). However, the coding cost estimation techniques described in this disclosure are not limited to any particular type of broadcast, multicast, unicast, or point-to-point system.

As illustrated in FIG. 1, encoding device 12 includes an encoding module 18 and a transmitter 20. Encoding module 18 receives one or more input multimedia sequences that can include, in the case of video encoding, one or more frames of data and selectively encodes the frames of the received multimedia sequences. Encoding module 18 receives the input multimedia sequences from one or more sources (not shown in FIG. 1). In some aspects, encoding module 18 may receive the input multimedia sequences from one or more video content providers, e.g., via satellite. As another example, encoding module 18 may receive the multimedia sequences from an image capture device (not shown in FIG. 1) integrated within encoding device 12 or coupled to encoding device 12. Alternatively, encoding module 18 may receive the multimedia sequences from a memory or archive (not shown in FIG. 1) within encoding device 12 or coupled to encoding device 12. The multimedia sequences may comprise live real-time or near real-time video, audio, or video and audio sequences to be coded and transmitted as a broadcast or on-demand, or may comprise pre-recorded and stored video, audio, or video and audio sequences to be coded and transmitted as a broadcast or on-demand. In some aspects, at least a portion of the multimedia sequences may be computer-generated, such as in the case of gaming.

In any case, encoding module 18 encodes and transmits a plurality of coded frames to decoding device 14 via transmitter 20. Encoding module 18 may encode the frames of the input multimedia sequences as intra-coded frames, inter-coded frames or a combination thereof. Frames encoded using intra-coding techniques are coded without reference to other frames, and are often referred to as intra ("I") frames. Frames encoded using inter-coding techniques are coded with reference to one or more other frames. The inter-coded frames may include one or more predictive ("P") frames, bi-directional ("B") frames, or a combination thereof P frames are encoded with reference to at least one temporally prior frame while B frames are encoded with reference to at least one temporally future frame. In some cases, B frames may be encoded with reference to at least one temporally future frame and at least one temporally prior frame.

Encoding module 18 may be further configured to partition a frame into a plurality of blocks and encode each of the blocks separately. As an example, encoding module 18 may partition the frame into a plurality of 16×16 blocks. Some blocks, often referred to as "macroblocks," comprise a grouping of sub-partition blocks (referred to herein as "sub-blocks"). As an example, a 16×16 macroblock may comprise four 8×8 sub-blocks, or other sub-partition blocks. For example, the H.264 standard permits encoding of blocks with a variety of different sizes, e.g., 16×16, 16×8, 8×16, 8×8, 4×4, 8×4, and 4×8. Further, by extension, sub-blocks of any size may be included within a macroblock, e.g., 2×16, 16×2, 2×2, 4×16, 8×2 and so on. Thus, encoding module 18 may be configured to divide the frame into several blocks and encode each of the blocks of pixels as intra-coded blocks or inter-coded blocks, each of which may be referred to generally as a block.

Encoding module 18 may support a plurality of coding modes. Each of the modes may be correspond to a different combination of block sizes and coding techniques. In the case of the H.264 standard, for example, there are seven inter modes and thirteen intra modes. The seven variable block-size inter modes include a SKIP mode, 16×16 mode, 16×8 mode, 8×16 mode, 8×8 mode, 8×4 mode, 4×8 mode, and 4×4 mode. The thirteen intra modes include an INTRA 4×4 mode for which there are nine possible interpolation directions and an INTRA 16×16 mode for which there are four possible interpolation directions.

To provide high compression efficiency, in accordance with various aspects of this disclosure, encoding module 18 attempts to select the mode that codes the data of the blocks with high efficiency. To this end, encoding module 18 estimates, for each of the blocks, a coding cost for at least a portion of the modes. Encoding module 18 estimates the coding cost as a function of rate and distortion. In accordance with the techniques described herein, encoding module 18 estimates the coding cost for the modes without actually coding the blocks to determine the rate and distortion metrics. In this manner, encoding module 18 may select one of the modes based on at least the coding cost without performing the computationally complex coding of the data of the block for each mode. Conventional mode selection requires actual coding of the data using each of the modes to determine which mode to select. Thus, the techniques save time and computational resources by selecting the mode based on the coding cost without actually coding the data for each of the modes. In fact, in some aspects, encoding module 18 may estimate the coding cost for the modes without quantizing the data of the block for each mode. In this manner, the coding cost estimation techniques of this disclosure reduce the amount of computationally intensive calculations needed to perform effective mode selection.

Encoding device 12 applies the selected mode to code the blocks of the frames and transmits the coded frames of data via transmitter 20. Transmitter 20 may include appropriate modem and driver circuitry software and/or firmware to transmit encoded multimedia over transmission channel 16. For wireless applications, transmitter 26 includes RF circuitry to transmit wireless data carrying the encoded multimedia data.

Decoding device 14 includes a receiver 22 and a decoding module 24. Decoding device 14 receives the encoded data from encoding device 12 via receiver 22. Like transmitter 20, receiver 22 may include appropriate modem and driver circuitry software and/or firmware to receive encoded multimedia over transmission channel 16, and may include RF circuitry to receive wireless data carrying the encoded multimedia data in wireless applications. Decoding module 24 decodes the coded frames of data received via receiver 22. Decoding device 14 may further present the decoded frame of data to a user via a display (not shown) that may be either integrated within decoding device 14 or provided as a discrete device coupled to decoding device 14 via a wired or wireless connection.

In some examples, encoding device 12 and decoding device 14 each may include reciprocal transmit and receive circuitry so that each may serve as both a transmit device and a receive device for encoded multimedia and other information transmitted over transmission channel 16. In this case, both encoding device 12 and decoding device 14 may transmit and receive multimedia sequences and thus participate in two-way communications. In other words, the illustrated components of coding system 10 may be integrated as part of an encoder/decoder (CODEC).

The components in encoding device 12 and decoding device 14 are exemplary of those applicable to implement the techniques described herein. Encoding device 12 and decoding device 14, however, may include many other components, if desired. For example, encoding device 12 may include a plurality of encoding modules that each receive one or more sequences of multimedia data and encode the respective sequences of multimedia data in accordance with the techniques described herein. In this case, encoding device 12 may further include at least one multiplexer to combine the segments of data for transmission. In addition, encoding device 12 and decoding device 14 may include appropriate modulation, demodulation, frequency conversion, filtering, and amplifier components for transmission and reception of encoded video, including radio frequency (RF) wireless components and antennas, as applicable. For ease of illustration, however, such components are not shown in FIG. 1.

Figure 2:
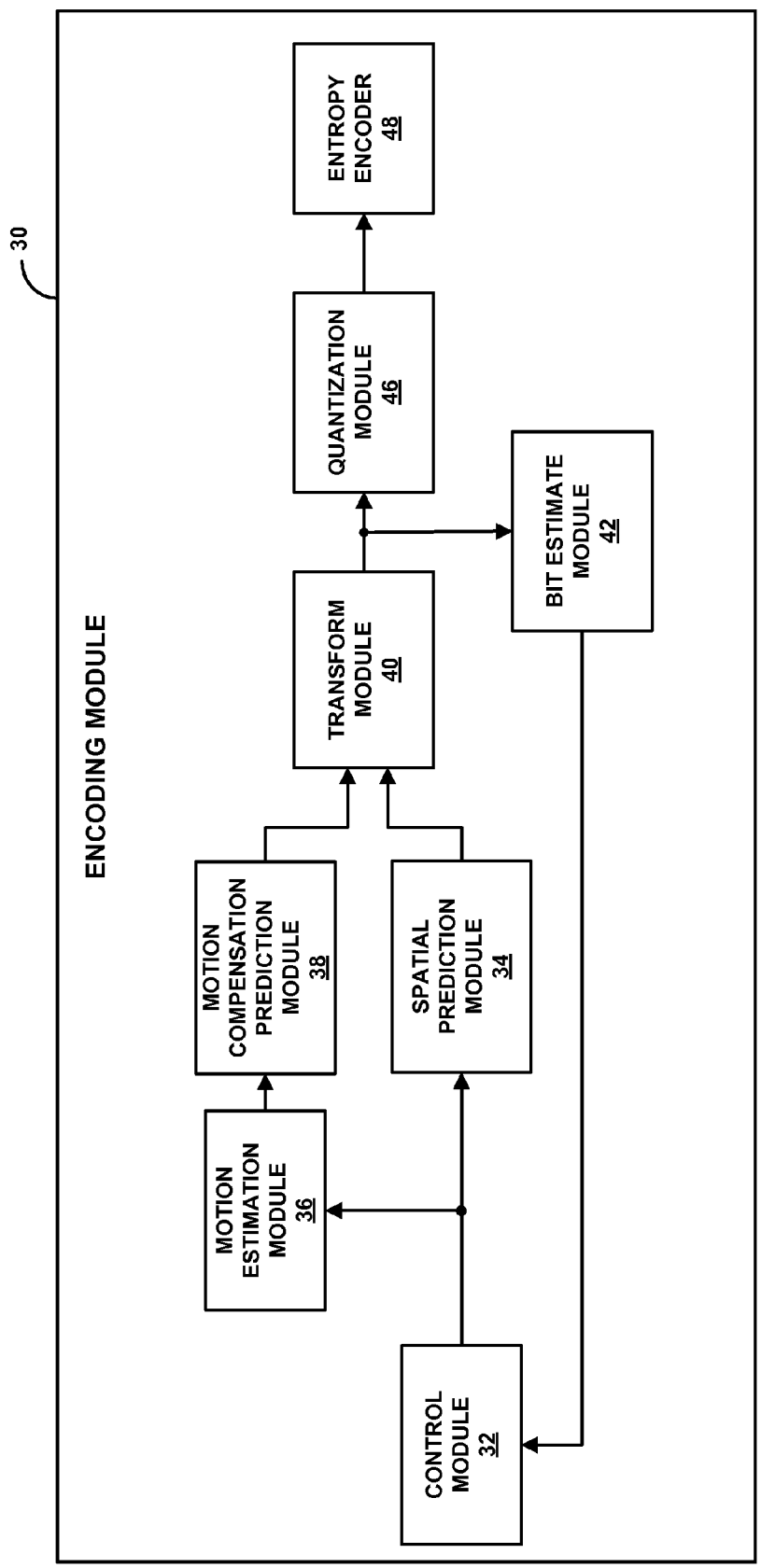
FIG. 2 is a block diagram illustrating an exemplary encoding module in further detail.

FIG. 2 is a block diagram illustrating an exemplary encoding module 30 in further detail. Encoding module 30 may, for example, represent encoding module 18 of encoding device 12 of FIG. 1. As illustrated in FIG. 2, encoding module 30 includes a control module 32 that receives input frames of multimedia data of one or more multimedia sequences from one or more sources, and processes the frames of the received multimedia sequences. In particular, control module 32 analyzes the incoming frames of the multimedia sequences and determines whether to encode or skip the incoming frames based on analysis of the frames. In some aspects, encoding device 12 may encode the information contained in the multimedia sequences at a reduced frame rate using frame skipping to conserve bandwidth across transmission channel 16.

Moreover, for the incoming frames that will be encoded, control module 32 may also be configured to determine whether to encode the frames as I frames, P frames, or B frames. Control module 32 may determine to encode an incoming frame as an I frame at the start of a multimedia sequence, at a scene change within the sequence, for use as a channel switch frame, or for use as an intra refresh frame. Otherwise, control module 32 encodes the frame as an inter-coded frame (i.e., a P frame or B frame) to reduce the amount of bandwidth associated with coding the frame.

Control module 32 may be further configured to partition the frames into a plurality of blocks and select a coding mode, such as one of the H.264 coding modes described above, for each of the blocks. As will be described in detail below, encoding module 30 may estimate the coding cost for at least a portion of the modes to assist in selecting a most efficient one of the coding modes. After selecting the coding mode for use in coding one of the blocks, encoding module 30 generates residual data for the block. For a block selected to be intra-coded, spatial prediction module 34 generates the residual data for the block. Spatial prediction module 34 may, for example, generate a predicted version of the block via interpolation using one or more adjacent blocks and the interpolation directionality corresponding to the selected intra-coding mode. Spatial prediction module 34 may then compute a difference between the block of the input frame and the predicted block. This difference is referred to as residual data or residual coefficients.

For a block selected to be inter-coded, motion estimation module 36 and motion compensation module 38 generate the residual data for the block. In particular, motion estimation module 36 identifies at least one reference frame and searches for a block in the reference frame that is a best match to the block in the input frame. Motion estimation module 36 computes a motion vector to represent an offset between the location of the block in the input frame and the location of the identified block in the reference frame. Motion compensation module 38 computes a difference between the block of the input frame and the identified block in the reference frame to which the motion vector points. This difference is the residual data for the block.

Encoding module 30 also includes a transform module 40, a quantization module 46 and an entropy encoder 48. Transform module 40 transforms the residual data of the block in accordance with a transform function. In some aspects, transform module 40 applies an integer transform, such as a 4×4 or 8×8 integer transform or a Discrete Cosine Transform (DCT), to the residual data to generate transform coefficients for the residual data. Quantization module 46 quantizes the transform coefficients and provides the quantized transform coefficients to entropy encoder 48. Entropy encoder 48 encodes the quantized transform coefficients using a context-adaptive coding technique, such as context-adaptive variable-length coding (CAVLC) or context-adaptive binary arithmetic coding (CABAC). As will be described in detail below, entropy encoder 48 applies a selected mode to code the data of the block.

Entropy encoder 48 may also encode additional data associated with the block. For example, in addition to the residual data, entropy encoder 48 may encode one or more motion vectors of the block, an identifier indicating the coding mode of the block, one or more reference frame indices, quantization parameter (QP) information, slice information of the block and the like. Entropy encoder 48 may receive this additional block data from other modules within encoding module 30. For example, the motion vector information may be received from motion estimation module 36 while the block mode information may be received from control module 32. In some aspects, entropy encoder 48 may code at least a portion of this additional information using a fixed length coding (FLC) technique or a universal variable length coding (VLC) technique, such as Exponential-Golomb coding ("Exp-Golomb"). Alternatively, entropy encoder 48 may encode a portion of the additional block data using the context-adaptive coding techniques described above, i.e., CABAC or CAVLC.

To assist control module 32 in selecting a mode for the block, control module 32 estimates a coding cost for at least a portion of the possible modes. In certain aspects, control module 32 may estimate the cost of coding the block in each of the possible coding modes. The cost may be estimated, for example, in terms of the number of bits associated with coding the block in a given mode versus the amount of distortion produced in that mode. In the case of the H.264 standard, for example, control module 32 may estimate the coding cost for twenty-two different coding modes (the inter- and intra-coding modes) for a block selected for inter-coding and thirteen different coding modes for a block selected for intra-coding. In other aspects, control module 32 may use another mode selection technique to initially reduce the set of possible modes, and then utilize the techniques of this disclosure to estimate the coding cost for the remaining modes of the set. In other words, in some aspects, control module 32 may narrow down the number of mode possibilities before applying the cost estimate technique. Advantageously, encoding module 30 estimates the coding costs for the modes without actually coding the data of the blocks for the different modes, thereby reducing computational overhead associated with the coding decision. In fact, in the example illustrated in FIG. 2, encoding module 30 may estimate the coding cost without quantizing the data of the block for the different modes. In this manner, the coding cost estimation techniques of this disclosure reduce the amount of computationally intensive calculations needed to compute the coding cost. In particular, it is not necessary to encode the blocks using the various coding modes in order to select one of the modes.

As will be described in more detail herein, control module 32 estimates the coding cost of each analyzed mode in accordance with the equation:

$$J = D + \lambda_{mode} \cdot R, \quad (1)$$

where J is the estimated coding cost, D is a distortion metric of the block, $\lambda_{mode}$ is a Lagrange multiplier of the respective mode, and R is a rate metric of the block. The distortion metric (D) may, for example, comprise a sum of absolute difference (SAD), sum of square difference (SSD), a sum of absolute transform difference (SATD), sum of square transform different (SSTD) or the like. The rate metric (R) may, for example, be a number of bits associated with coding the data in a given block. As described above, different types of block data may be coded using different coding techniques. Equation (1) may thus be re-written in the form below:

$$J = D + \lambda_{mode}(R_{context} + R_{non\_context}), \quad (2)$$

where $R_{context}$ represents a rate metric for block data coded using context-adaptive coding techniques and $R_{non\_context}$ represents a rate metric for block data coded using non context-adaptive coding techniques. In the H.264 standard, for example, the residual data may be coded using context-adaptive coding, such CAVLC or CABAC. Other block data, such as motion vectors, block modes, and the like may be coded using a FLC or a universal VLC technique, such as Exp-Golomb. In this case, equation (2) may be re-written in the form:

$$J = D + \lambda_{mode}(R_{residual} + R_{other}), \quad (3)$$

where Rresidual represents a rate metric for coding the residual data using context-adaptive coding techniques, e.g., the number of bits associated with coding the residual data, and Rother represents a rate metric for coding the other block data using a FLC or universal VLC technique, e.g., the number of bits associated with coding the other block data.

In computing the estimated coding cost (J), encoding module 30 may determine the number of the bits associated with coding block data using FLC or universal VLC, i.e., $R_{other}$, relatively easy. Encoding module 30 may, for example, use a code table to identify the number of bits associated with coding the block data using FLC or universal VLC. The code table may, for example, include a plurality of codewords and the number of bits associated with coding the codeword. Determining the number of bits associated with coding the residual data ($R_{residual}$), however, presents a much more difficult task due to the adaptive nature of context-adaptive coding as a function of the context of the data. To determine the precise number of bits associated with coding the residual data, or whatever data is being context-adaptive coded, encoding module 30 must transform the residual data, quantize the transformed residual data and encode the transform-quantized residual data. However, in accordance with the techniques of this disclosure, bit estimate module 42 may estimate the number of bits associated with coding the residual data using the context-adaptive coding techniques without actually coding the residual data.

In the example illustrated in FIG. 2, bit estimate module 42 estimates the number of bits associated with coding the residual data using transform coefficients for the residual data. Thus, for each mode to be analyzed, encoding module 30 only needs to compute the transform coefficients for the residual data to estimate the number of bits associated with coding the residual data. Encoding module 30 therefore reduces the amount of computing resources and time required to determine the number of bits associated with coding the residual data by not quantizing the transform coefficients or encoding the quantized transform coefficients for each of the modes.

Bit estimate module 42 analyzes the transform coefficients output by transform module 40 to identify one or more transform coefficients that will remain non-zero after quantization. In particular, bit estimate module 42 compares each of the transform coefficients to a corresponding threshold. In some aspects, the corresponding thresholds may be computed as a function of a QP of encoding module 30. Bit estimate module 42 identifies, as the transform coefficients that will remain non-zero after quantization, the transform coefficients that are greater than or equal to their corresponding thresholds.

Bit estimate module 42 estimates the number of bits associated with coding the residual data based on at least the transform coefficients identified to remain non-zero after quantization. In particular, bit estimate module 42 determines the number of non-zero transform coefficients that will survive quantization. Bit estimate module 42 also sums at least a portion of the absolute values of the transform coefficients identified to survive quantization. Bit estimate module 42 then estimates the rate metric for the residual data, i.e., the number of bits associated with coding the residual data, using the equation:

$$R_{residual} = a_1 * SATD + a_2 * NZ_{est} + a_3, \quad (4)$$

where SATD is the sum of the at least a portion absolute values of the non-zero transform coefficients predicted to survive quantization, $NZ_{est}$ is the estimated number of non-zero transform coefficients predicted to survive quantization and $a_1$, $a_2$, and $a_3$ are coefficients. Coefficients $a_1$, $a_2$, and $a_3$ may be computed, for example, using least squares estimation. Although the sum of the transform coefficients is the sum of absolute transform differences SATDs in the example of equation (4), other difference coefficients may be used such as SSTDs.

An exemplary computation of $R_{residual}$ for a 4×4 block is illustrated below. Similar computations may be performed for blocks of different sizes. Encoding module 30 computes a matrix of transform coefficients for the residual data. An exemplary matrix of transform coefficients is illustrated below.

$$A = \begin{pmatrix} 326 & 191 & 12 & 63 \\ 675 & -18 & -85 & 371 \\ 108 & 155 & 114 & 45 \\ 15 & 421 & 5 & -12 \end{pmatrix}$$

The number of rows of the matrix of transform coefficients (A) is equal to the number of rows of pixels in the block and the number of columns of the matrix of transform coefficients is equal to the number of columns of pixels in the block. Thus, in the example above, the dimensions of the matrix of transform coefficients is 4×4 to correspond with the 4×4 block. Each of the entries A (i, j) of the matrix of transform coefficients is the transform of the respective residual coefficients.

During quantization, the transform coefficients of matrix A that have smaller values tend to become zero after quantization. As such, encoding module 30 compares the matrix of residual transform coefficients A to a matrix of threshold values to predict which of the transform coefficient of matrix A will remain non-zero after quantization. An exemplary matrix of threshold values is illustrated below.

$$C = \begin{pmatrix} 93 & 150 & 93 & 150 \\ 150 & 240 & 150 & 240 \\ 93 & 150 & 93 & 150 \\ 150 & 240 & 150 & 240 \end{pmatrix}$$

The matrix C may be computed as a function of a QP value. The dimensions of matrix C are the same as the dimensions of matrix A. In the case of the H.264 standard, for example, the entries of matrix C may be computed based on the equation:

$$C(i, j) = \frac{2^{QBITS\{QP\}} - \text{Level\_Offset}(i, j)\{QP\}}{\text{Level\_Scale}(i, j)\{QP\}} \forall i, j, QP, \quad (5)$$

where QBITS{QP} is a parameter that determines scaling as a function of QP, Level-_Offset(i, j){QP} is a deadzone parameter for the entry at row i and column j of the matrix and is also a function of QP, Level_Scale(i, j){QP} is a multiplicative factor for the entry at row i and column j of the matrix and is also a function of QP, i corresponds to a row of the matrix, j corresponds to a column of the matrix, and QP corresponds to a quantization parameter of encoding module 30. In the example equation (5), the variables may be defined in the H.264 coding standard as a function of the operating QP. Other equations may be used to determine which of the variables will survive quantization, and may be defined in other coding standards based on the quantization method adopted by the particular standard. In some aspects, encoding module 30 may be configured to operate within a range of QP values. In this case, encoding module 30 may pre-compute a plurality of comparison matrices that corresponds with each of the QP values in the range of QP values. Encoding module 30 selects the comparison matrix that corresponds with the QP of encoding module 30 to compare with the transform coefficient matrix.

The result of the comparison between the matrix of transform coefficients A and the matrix of thresholds C is a matrix of ones and zeros. In the example above, the comparison results in the matrix of ones and zeros illustrated below:

$$M = (\text{abs}(A(i, j)) > C(i, j)) \forall i, j, QP = \begin{pmatrix} 1 & 1 & 0 & 0 \\ 1 & 0 & 0 & 1 \\ 1 & 1 & 1 & 0 \\ 0 & 1 & 0 & 0 \end{pmatrix},$$

where the ones represent locations of transform coefficients identified as likely to survive quantization, i.e., likely to remain non-zero, and the zeros represent locations of transform coefficients not likely to survive quantization, i.e., likely to become zero. As described above, a transform coefficient is identified as likely to remain non-zero when the absolute value of the transform coefficient of matrix A is greater than or equal to the corresponding threshold of matrix C.

Using the resulting matrix of ones and zeros, bit estimate module 42 determines the number of transform coefficients that will survive quantization. In other words, bit estimate module 42 determines the number of transform coefficients identified as remaining non-zero after quantization. Bit estimate module 42 may determine the number of transform coefficients identified as remaining non-zero after quantization according to the equation:

$$NZ_{est} = \sum_{i=0}^{3} \sum_{j=0}^{3} M(i, j), \quad (6)$$

where $NZ_{est}$ is the estimated number of non-zero transform coefficients and M(i, j) is the value of the matrix M at row i and column j. In the example described above, $NZ_{est}$ is equal to 8.

Bit estimate module 42 also computes a sum of at least a portion of the absolute value of the transform coefficients estimated to survive quantization. In certain aspects, bit estimate module 42 may compute the sum of the at least a portion of absolute values of the transform coefficients according to the equation:

$$SATD = \sum_{i=0}^{3} \sum_{j=0}^{3} (M(i, j)*\text{abs}(A(i, j))), \quad (7)$$

where SATD is the sum total of the transform coefficients identified as remaining non-zero after quantization, M(i, j) is the value of the matrix M at row i and column j, and A (i, j) is the value of the matrix A at row i and column j, and abs(x) is an absolute value function that computes the absolute value of x. In the example described above, SATD is equal to 2361. Other difference metrics may be used for the transform coefficients, such as SSTDs.

Using these values, bit estimate module 42 approximates the number of bits associated with coding the residual coefficients using equation (3) above. Control module 32 may use the estimate of $R_{residual}$ to compute an estimate of the total coding cost of the mode. Encoding module 30 may estimate the total coding cost for one or more other possible modes in the same manner, and then select the mode with the smallest coding cost. Encoding module 30 then applies the selected coding mode to code the block or blocks of the frame.

The foregoing techniques may be implemented individually, or two or more of such techniques, or all of such techniques, may be implemented together in encoding device 12. The components in encoding module 30 are exemplary of those applicable to implement the techniques described herein. Encoding module 30, however, may include many other components, if desired, as well as fewer components that combine the functionality of one or more of the modules described above. The components in encoding module 30 may be implemented as one or more processors, digital signal processors, application specific integrated circuits (ASICs), field programmable gate arrays (FPGAs), discrete logic, software, hardware, firmware, or any combinations thereof. Depiction of different features as modules is intended to highlight different functional aspects of encoding module 30 and does not necessarily imply that such modules must be realized by separate hardware or software components. Rather, functionality associated with one or more modules may be integrated within common or separate hardware or software components.

Figure 3:
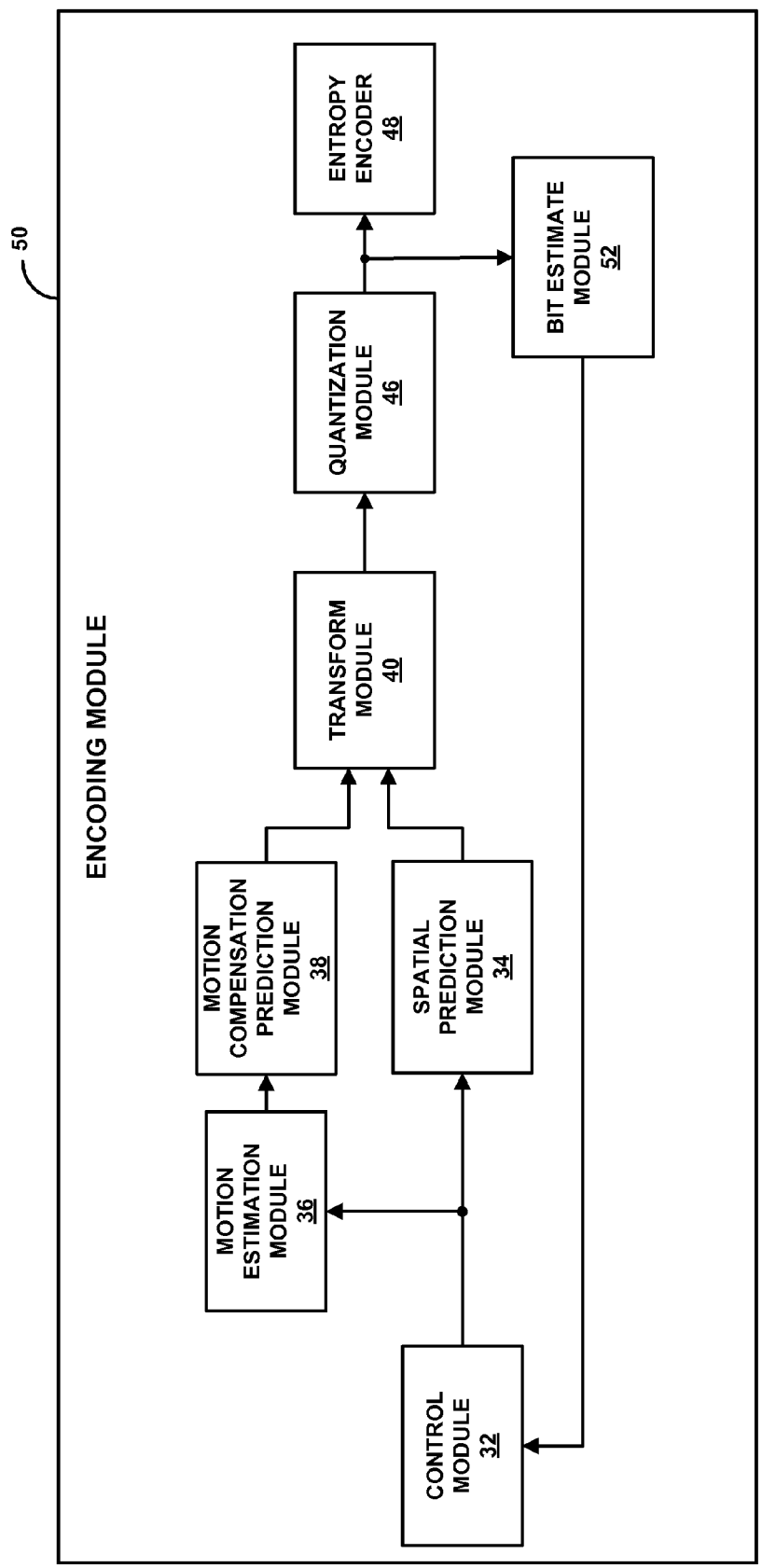
FIG. 3 is a block diagram illustrating another exemplary encoding module in further detail.

FIG. 3 is a block diagram illustrating another exemplary encoding module 50. Encoding module 50 of FIG. 3 conforms substantially to encoding module 30 of FIG. 2, except bit estimate module 52 of encoding module 50 estimates the number of bits associated with coding the residual data after quantization of the transform coefficients for the residual data. In particular, after quantization of the transform coefficients, bit estimate module 52 estimates the number of bits associated with coding the residual coefficients using the equation:

$$R_{residual}=a_1*SATQD+a_2*NZ_{TQ}+a_3, \quad (8)$$

where SATQD is the sum of the absolute values of the non-zero quantized transform coefficients, $NZ_{TQ}$ is the number of non-zero quantized transform coefficients, and $a_1$, $a_2$, and $a_3$ are coefficients. Coefficients $a_1$, $a_2$, and $a_3$ may be computed, for example, using least squares estimation. Although encoding module 50 quantizes the transform coefficients prior to estimating the number of bits associated with coding the residual data, encoding module 50 still estimates the coding costs for the modes without actually coding the data of the blocks. Thus, the amount of computationally intensive calculations is still reduced.

Figure 4:
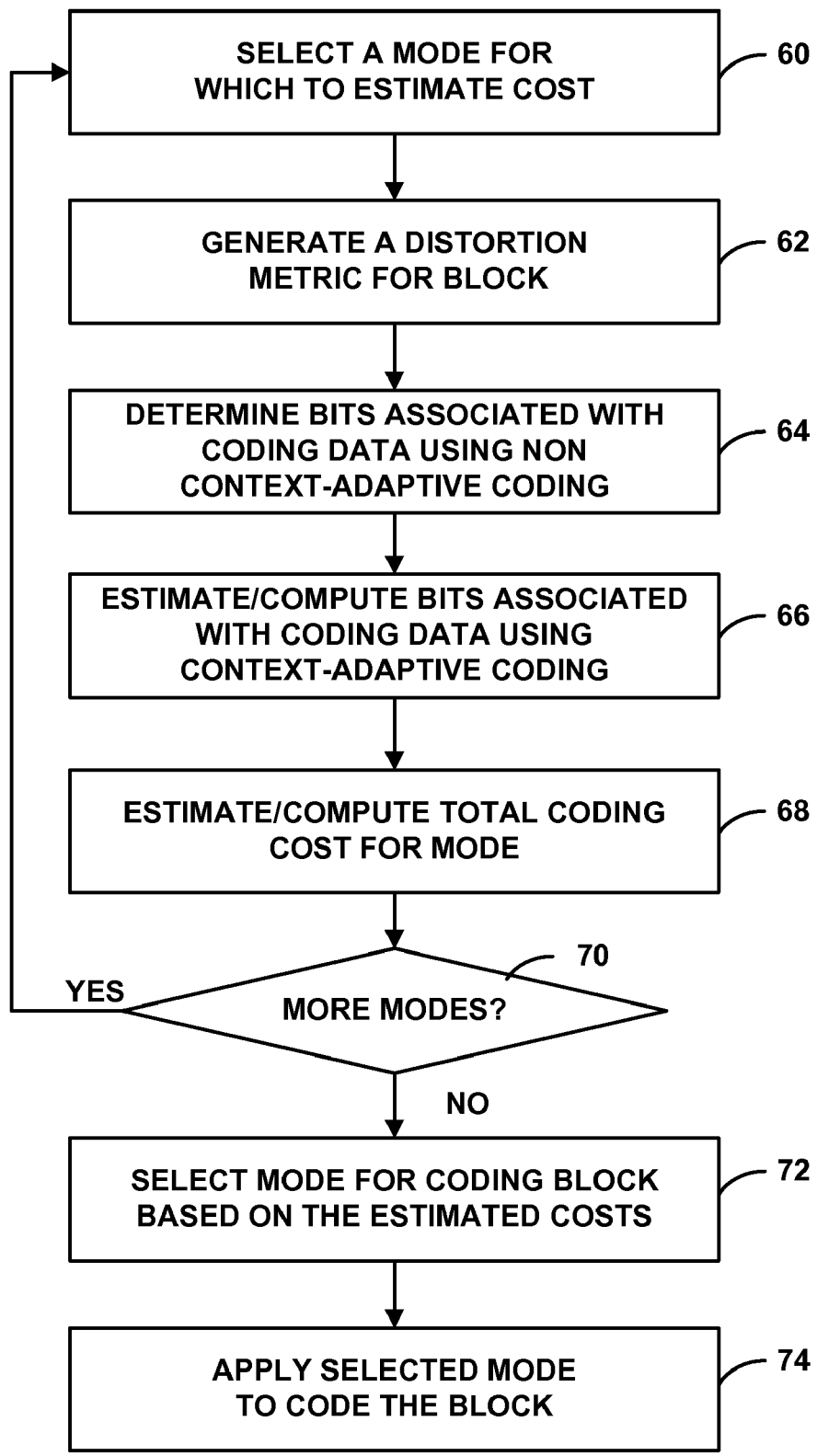
FIG. 4 is a flow diagram illustrating exemplary operation of an encoding module selecting an encoding mode based on estimated coding costs.

FIG. 4 is a flow diagram illustrating exemplary operation of an encoding module, such as encoding module 30 of FIG. 2 and/or encoding module 50 of FIG. 3, selecting an encoding mode based on at least the estimated coding costs. For exemplary purposes, however, FIG. 4 will be discussed in terms of encoding module 30. Encoding module 30 selects a mode for which to estimate a coding cost (60). Encoding module 30 generate a distortion metric for the current block (62). Encoding module 30 may, for example, compute the distortion metric based on a comparison between the block and at least one reference block. In the case of a block selected to be intra-coded, the reference block may be an adjacent block within the same frame. For a block selected to be inter-coded, on the other hand, the reference block may be a block from an adjacent frame. The distortion metric may be, for example, a SAD, SSD, SATD, SSTD, or other similar distortion metric.

In the example of FIG. 4, encoding module 30 determines the number of bits associated with coding the portion of the data that is coded using non context-adaptive coding techniques (64). As described above, this data may include one or more motion vectors of the block, an identifier that indicates a coding mode of the block, one or more reference frame indices, QP information, slice information of the block and the like. Encoding module 30 may, for example, use a code table to identify the number of bits associated with coding the data using FLC, universal VLC or other non context-adaptive coding technique.

Encoding module 30 estimates and/or computes the number of bits associated with coding the portion of the data that is coded using context-adaptive coding techniques (66). In the context of the H.264 standard, for example, encoding module 30 may estimate the number of bits associated with coding the residual data using context-adaptive coding. Encoding module 30 may estimate the number of bits associated with coding the residual data without actually performing the coding the residual data. In certain aspects, encoding module 30 may estimate the number of bits associated with coding the residual data without quantizing the residual data. For example, encoding module 30 may compute transform coefficients for the residual data and identify the transform coefficients likely to remain non-zero after quantization. Using these identified transform coefficients, encoding module 30 estimates the number of bits associated with coding the residual data. In other aspects, encoding module 30 may quantize the transform coefficients and estimate the number of bits associated with coding the residual data based on at least the quantized transform coefficients. In either case, encoding module 30 saves time and processing resources by estimating the required number of bits. If there are sufficient computing resources, encoding module 30 may compute the actual number of bits required instead of estimating.

Encoding module 30 estimates and/or computes the total coding cost for coding the block in the selected mode (68). Encoding module 30 may estimate the total coding cost for coding the block based on the distortion metric, the bits associated with coding the portion of the data that is coded using non context-adaptive coding and the bits associated with coding the portion of the data that is coded using context-adaptive coding. For example, encoding module 30 may estimate the total coding cost for coding the block in the selected mode using equation (2) or (3) above.

Encoding module 30 determines whether there are any other coding modes for which to estimate the coding cost (70). As described above, encoding module 30 estimates the coding cost for at least a portion of the possible modes. In certain aspects, encoding module 30 may estimate the cost of coding the block in each of the possible coding modes. In the context of the H.264 standard, for example, encoding module 30 may estimate the coding cost for twenty-two different coding modes (the inter- and intra-coding modes) for a block selected for inter-coding and thirteen different coding modes for a block selected for intra-coding. In other aspects, encoding module 30 may use another mode selection technique to initially reduce the set of possible modes, and then utilize the techniques of this disclosure to estimate the coding cost for the reduced set of coding modes.

When there are more coding modes for which to estimate the coding cost, encoding module 30 selects the next coding mode and estimates the cost of coding the data in the selected coding mode. When there are no more coding modes for which to estimate the coding cost, encoding module 30 selects one of the modes to use for coding the block based on at least the estimated coding costs (72). In one example, coding module 30 may select the coding mode that has the smallest estimated coding cost. Upon selection of the mode, coding module 30 may apply the selected mode to code the particular block (74). The process may continue for additional blocks in a given frame. As an example, the process may continue until all the blocks in the frame have been coded using the coding mode selected in accordance with the techniques described herein. Moreover, the process may continue until blocks of a plurality of frames have been coded using a high efficiency mode.

Figure 5:
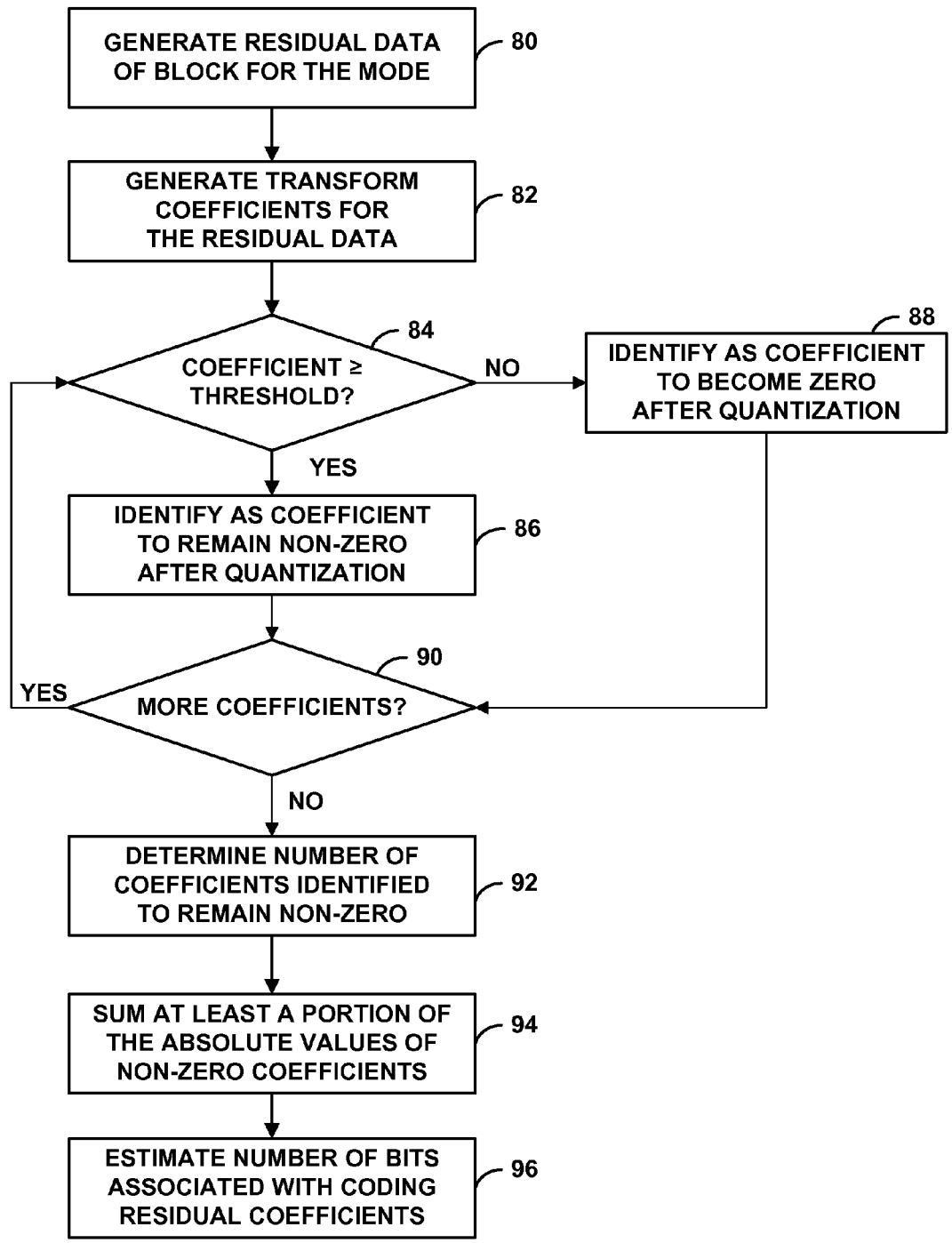
FIG. 5 is a flow diagram illustrating exemplary operation of an encoding module estimating the number of bits associated with coding the residual data of a block without quantizing or encoding of the residual data.

FIG. 5 is a flow diagram illustrating exemplary operation of an encoding module, such as encoding module 30 of FIG. 2, estimating the number of bits associated with coding the residual coefficients of a block. After selecting one of the coding modes for which to estimate the coding cost, encoding module 30 generates the residual data of the block for the selected mode (80). For a block selected to be intra-coded, for example, spatial prediction module 34 generate the residual data for the block based on a comparison of the block with a predicted version of the block. Alternatively, for a block selected to be inter-coded, motion estimation module 36 and motion compensation module 38 compute the residual data for the block based on a comparison between the block and a corresponding block in a reference frame. In some aspects, the residual data may have already been computed to generate the distortion metric of the block. In this case, encoding module 30 may retrieve the residual data from a memory.

Transform module 40 transforms the residual coefficients of the block in accordance with a transform function to generate transform coefficients for the residual data (82). Transform module 40 may, for example, apply a 4×4 or 8×8 integer transform or a DCT transform to the residual data to generate the transform coefficients for the residual data. Bit estimate module 42 compares one of the transform coefficients to a corresponding threshold to determine whether the transform coefficient is greater than or equal to the threshold (84). The threshold corresponding with the transform coefficient may be computed as a function of the QP of encoding module 30. If the transform coefficient is greater than or equal to the corresponding threshold, bit estimate module 42 identifies the transform coefficient as a coefficient that will remain non-zero after quantization (86). If the transform coefficient is less than the corresponding threshold, bit estimate module 42 identifies the transform coefficient as a coefficient that will become zero after quantization (88).

Bit estimate module 42 determines whether there are any additional transform coefficients for the residual data of the block (90). If there are additional transform coefficients of the block, bit estimate module 42 selects another one of the coefficients and compares it to a corresponding threshold. If there are no additional transform coefficients to analyze, bit estimate module 42 determines the number of coefficients identified to remain non-zero after quantization (92). Bit estimate module 42 also sums at least a portion of the absolute values of the transform coefficients identified to remain non-zero after quantization (94). Bit estimate module 42 estimates the number of bits associated with coding the residual data using the determined number of non-zero coefficients and the sum of the portion of the non-zero coefficients (96). Bit estimate module 42 may, for example, estimate the number of bits associated with coding the residual data using equation (4) above. In this manner, the encoding module 30 estimates the number of bits associated with coding the residual data of the block in the selected mode without quantizing or encoding the residual data.

Figure 6:
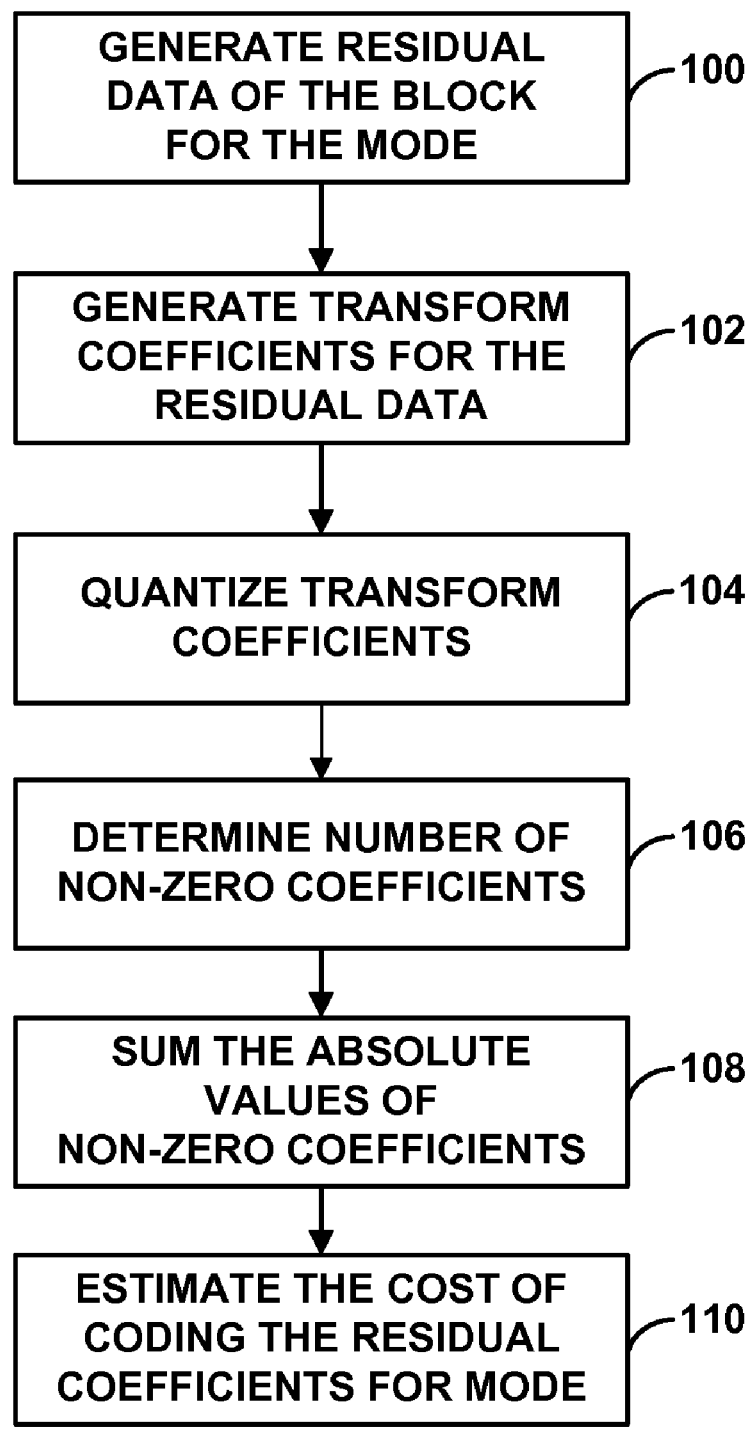
FIG. 6 is a flow diagram illustrating exemplary operation of an encoding module estimating the number of bits associated with coding the residual data of a block without encoding the residual data.

FIG. 6 is a flow diagram illustrating exemplary operation of an encoding module, such as encoding module 50 of FIG. 3, estimating the number of bits associated with coding the residual coefficients of a block. After selecting one of the coding modes for which to estimate the coding cost, encoding module 50 generates the residual coefficients of the block (100). For a block selected to be intra-coded, for example, spatial prediction module 34 computes the residual data for the block based on a comparison of the block with a predicted version of the block. Alternatively, for a block selected to be inter-coded, motion estimation module 36 and motion compensation module 38 compute the residual data for the block based on a comparison between the block and a corresponding block in a reference frame. In some aspects, the residual coefficients may have already been computed to generate the distortion metric of the block.

Transform module 40 transforms the residual coefficients of the block in accordance with a transform function to generate transform coefficients for the residual data (102). Transform module 40 may, for example, apply a 4×4 or 8×8 integer transform or a DCT transform to the residual data to generate transformed residual coefficients. Quantization module 46 quantizes the transform coefficients in accordance with a QP of encoding module 50 (104).

Bit estimate module 52 determines the number of quantized transform coefficients that are non-zero (106). Bit estimate module 42 also sums the absolute values of the non-zero levels or quantized transform coefficients (108). Bit estimate module 52 estimates the number of bits associated with coding the residual data using the computed number of non-zero quantized transform coefficients and the sum of the non-zero quantized transform coefficients (110). Bit estimate module 52 may, for example, estimate the number of bits associated with coding the residual coefficients using equation (4) above. In this manner, the encoding module estimates the number of bits associated with coding the residual data of the block in the selected mode without encoding the residual data.

Based on the teachings described herein, it should be apparent that an aspect disclosed herein may be implemented independently of any other aspects and that two or more of these aspects may be combined in various ways. The techniques described herein may be implemented in hardware, software, firmware, or any combination thereof. If implemented in hardware, the techniques may be realized using digital hardware, analog hardware or a combination thereof. If implemented in software, the techniques may be realized at least in part by a computer-program product that includes a computer readable medium having instructions or code stored thereon. The instructions or code associated with a computer-readable medium of the computer program product may be executed by a computer, e.g., by one or more processors, such as one or more digital signal processors (DSPs), general purpose microprocessors, ASICs, FPGAs, or other equivalent integrated or discrete logic circuitry.

By way of example, and not limitation, such computer-readable media can comprise RAM, such as synchronous dynamic random access memory (SDRAM), read-only memory (ROM), non-volatile random access memory (NVRAM), ROM, electrically erasable programmable read-only memory (EEPROM), EEPROM, FLASH memory, CD-ROM or other optical disk storage, magnetic disk storage or other magnetic storage devices, or any other tangible medium that can be used to carry or store desired program code in the form of instructions or data structures and that can be accessed by a computer.

A number of aspects and examples have been described. However, various modifications to these examples are possible, and the principles presented herein may be applied to other aspects as well. These and other aspects are within the scope of the following claims.

What is claimed is:

1. A method for processing digital video data, the method comprising:
   identifying, by a processor, one or more transform coefficients for residual data of a block of pixels that are non zero and will remain non zero when quantized, wherein the identifying is performed without quantizing the one or more transform coefficients;
   generating a matrix of the transform coefficients, wherein a number of rows of the matrix of transform coefficients is equal to a number of rows of pixels in the block and a number of columns of the matrix of transform coefficients is equal to a number of columns of pixels in the block;
   comparing the matrix of transform coefficients to a matrix of thresholds, wherein the matrix of thresholds has a dimension the same as that of the matrix of transform coefficients, and further wherein the comparison results in a matrix of ones and zeros, where the zeros represent locations in the matrix of transform coefficients that will become zero after quantization and the ones represent locations in the matrix of transform coefficients that will remain non zero after quantization;
   summing a number of ones in the matrix of ones and zeros to compute a number of the transform coefficients identified as remaining non zero when quantized;
   summing absolute values of at least one of the transform coefficients in the matrix of transform coefficients that correspond to the location of the ones in the matrix of ones and zeros;
   estimating a number of bits associated with coding of the residual data based on at least the number of non zero transform coefficients and the sum of the at least one non zero transform coefficient; and
   estimating a coding cost for coding the block of pixels based on at least the estimated number of bits associated with coding the residual data.

2. The method of claim 1, wherein each of the thresholds of the matrix of thresholds is computed as a function of a quantization parameter (QP).

3. The method of claim 2, wherein the locations of the matrix of transform coefficients that will remain non zero after quantization correspond to transform coefficients that satisfy their corresponding threshold.

4. The method of claim 2, further comprising:
   pre computing a plurality of matrices of thresholds, wherein each of the matrices of thresholds corresponds to a different value of the QP; and
   selecting the matrix of thresholds from the plurality of matrices of thresholds based on the value of the QP used for encoding the block of pixels.

5. An apparatus for processing digital video data, the apparatus comprising:
   a transform module that generates transform coefficients for residual data of a block of pixels and generates a matrix of the transform coefficients, wherein a number of rows of the matrix of transform coefficients is equal to a number of rows of pixels in the block and a number of columns of the matrix of transform coefficients is equal to a number of columns of pixels in the block;
   a bit estimate module implemented as a processor that identifies one or more of the transform coefficients that are unquantized and non zero and will remain non zero when quantized, compares the matrix of transform coefficients to a matrix of thresholds, wherein the matrix of thresholds has a dimension the same as that of the matrix of transform coefficients, and further wherein the comparison results in a matrix of ones and zeros, where the zeros represent locations in the matrix of transform coefficients that will become zero after quantization and the ones represent locations in the matrix of transform coefficients that will remain non zero after quantization, sums a number of ones in the matrix of ones and zeros to compute a number of the transform coefficients identified as remaining non zero when quantized, sums absolute values of at least one of the transform coefficients in the matrix of transform coefficients that correspond to the location of the ones in the matrix of ones and zeros, and estimates a number of bits associated with coding of the residual data based on at least the number of non zero transform coefficients and the sum of the at least one non zero transform coefficient; and
   a control module that estimates a coding cost for coding the block of pixels based on at least the estimated number of bits associated with coding the residual data.

6. The apparatus of claim 5, wherein each of the thresholds of the matrix of thresholds is computed as a function of a quantization parameter (QP).

7. The apparatus of claim 6, wherein the locations of the matrix of transform coefficients that will remain non zero after quantization correspond to transform coefficients that satisfy their corresponding threshold.

8. The apparatus of claim 6, wherein the bit estimate module pre computes a plurality of sets of thresholds, wherein each of the sets of thresholds corresponds to a different value of the QP, and selects one of the plurality of sets of thresholds to be used as the matrix of thresholds based on the value of the QP used for encoding the block of pixels.

9. An apparatus for processing digital video data, the apparatus comprising:
   means for identifying one or more transform coefficients for residual data of a block of pixels that are non zero and unquantized and will remain non zero when quantized;
   means for generating a matrix of the transform coefficients, wherein a number of rows of the matrix of transform coefficients is equal to a number of rows of pixels in the block and a number of columns of the matrix of transform coefficients is equal to a number of columns of pixels in the block, wherein the identifying means compares the matrix of transform coefficients to a matrix of thresholds, wherein the matrix of thresholds has a dimension the same as that of the matrix of transform coefficients, and further wherein the comparison results in a matrix of ones and zeros, where the zeros represent locations in the matrix of transform coefficients that will become zero after quantization and the ones represent locations in the matrix of transform coefficients that will remain non zero after quantization;

means for estimating a number of bits associated with coding of the residual data by summing a number of ones in the matrix of ones and zeros to compute a number of the transform coefficients identified as remaining non zero when quantized, summing absolute values of at least one of the transform coefficients in the matrix of transform coefficients that correspond to the location of the ones in the matrix of ones and zeros, and estimating the number of bits associated with coding of the residual data based on at least the number of non zero transform coefficients and the sum of the at least one non zero transform coefficient;

means for estimating a coding cost for coding the block of pixels based on at least the estimated number of bits associated with coding the residual data.

10. The apparatus of claim 9, wherein each of the thresholds of the matrix of thresholds is computed as a function of a quantization parameter (QP).

11. The apparatus of claim 10, wherein the locations of the matrix of transform coefficients that will remain non zero after quantization correspond to transform coefficients that satisfy their corresponding threshold.

12. The apparatus of claim 10, further comprising:
means for pre computing a plurality of sets of thresholds, wherein each of the sets of thresholds corresponds to a different value of the QP; and
means for selecting one of the plurality of sets of thresholds for use in the matrix of thresholds based on the value of the QP used for encoding the block of pixels.

13. A computer-program product for processing digital video data comprising a computer readable non-transitory medium having instructions thereon, the instructions comprising:
code for identifying one or more transform coefficients for residual data of a block of pixels that are unquantized and non zero and will remain non zero when quantized;
code for generating a matrix of the transform coefficients, wherein a number of rows of the matrix of transform coefficients is equal to a number of rows of pixels in the block and a number of columns of the matrix of transform coefficients is equal to a number of columns of pixels in the block;
code for comparing the matrix of transform coefficients to a matrix of thresholds, wherein the matrix of thresholds has a dimension the same as that of the matrix of transform coefficients, and further wherein the comparison results in a matrix of ones and zeros, where the zeros represent locations in the matrix of transform coefficients that will become zero after quantization and the ones represent locations in the matrix of transform coefficients that will remain non zero after quantization; and
code for summing a number of ones in the matrix of ones and zeros to compute a number of the transform coefficients identified as remaining non zero when quantized;
code for summing absolute values of at least one of the transform coefficients in the matrix of transform coefficients that correspond to the location of the ones in the matrix of ones and zeros;
code for estimating a number of bits associated with coding of the residual data based on at least the number of non zero transform coefficients and the sum of the at least one non zero transform coefficients; and
code for estimating a coding cost for coding the block of pixels based on at least the estimated number of bits associated with coding the residual data.

14. The computer-program product of claim 13, wherein each of the thresholds of the matrix of thresholds is computed as a function of a quantization parameter (QP).

15. The computer-program product of claim 14, wherein the locations of the matrix of transform coefficients that will remain non zero after quantization correspond to transform coefficients that satisfy their corresponding threshold.

16. The computer-program product of claim 14, further comprising:
code for pre computing a plurality of sets of thresholds, wherein each of the sets of thresholds corresponds to a different value of the QP; and
code for selecting one of the plurality of sets of thresholds to be used to populate the matrix of thresholds based on the value of the QP used for encoding the block of pixels.

17. The method of claim 1, wherein estimating the number of bits associated with coding of the residual data further comprises estimating a number of bits required to code the residual data in each of at least two block modes, and estimating the coding cost further comprises estimating, in each of the at least two block modes, the coding cost based on at least the estimated number of bits associated with coding of the residual data in the respective one of the block modes, and further comprising selecting one of the block modes based on at least the estimated coding cost for each of the modes.

18. The method of claim 17, further comprising:
estimating, for each of the modes, a total coding cost for coding the block of pixels using at least the estimated number of bits associated with coding of the residual data;
selecting one of the modes with a smallest estimated total coding cost; and
applying the selected mode to code the block of pixels.

19. The method of claim 18, wherein estimating the total coding cost comprises:
computing a distortion metric for the block of pixels;
computing a number of bits associated with coding of non-residual data of the block of pixels; and
estimating the total coding cost for coding the block of pixels based on at least the distortion metric, the number of bits associated with coding of the non-residual data and the number of bits associated with coding of the residual data.

20. The method of claim 1, further comprising:
selecting a coding mode based on at least the estimated number of bits associated with coding of the residual data;
quantizing the one or more transform coefficients for the residual data after selecting the coding mode;
encoding the quantized transform coefficients for the residual data; and
transmitting the encoded coefficients for the residual data.

21. The apparatus of claim 5, wherein:
the bit estimate module further estimates the number of bits associated with coding of the residual data in each of at least two block modes, and
the control module further estimates the coding cost for each of the at least two block modes based on at least the estimated number of bits associated with coding of the residual data in the respective one of the block modes and selects one of the block modes based on at least the estimated coding cost for each of the modes.

22. The apparatus of claim 21, wherein the control module further estimates, for each of the modes, a total coding cost for coding the block of pixels using at least the estimated number of bits associated with coding of the residual data, selects one of the modes with a smallest estimated total coding cost, and applies the selected mode to code the block of pixels.

23. The apparatus of claim 22, wherein the control module computes a distortion metric for the block of pixels, computes a number of bits associated with coding of non-residual data of the block of pixels and estimates the total coding cost for coding the block of pixels based on at least the distortion metric, the number of bits associated with coding of the non-residual data and the number of bits associated with coding of the residual data.

24. The apparatus of claim 5, further comprising:
the control module that selects a coding mode based on at least the estimated number of bits associated with coding the residual data;
a quantization module that quantizes the one or more transform coefficients for the residual data after selecting the coding mode;
an entropy encoding module that encodes the quantized transform coefficients for the residual data; and
a transmitter that transmits the encoded coefficients for the residual data.

25. The apparatus of claim 9, wherein the bits estimating means further estimates the number of bits associated with coding of the residual data in each of at least two block modes and the coding cost estimating means further estimates the coding cost for each of the at least two block modes based on at least the estimated number of bits associated with coding the residual data in the respective one of the block modes, and further comprising means for selecting one of the block modes based on at least the estimated number of bits for each of the modes.

26. The apparatus of claim 25, further comprising means for estimating, for each of the modes, a total coding cost for coding the block of pixels using at least the estimated number of bits associated with coding of the residual data, wherein the selecting means selects one of the modes with a smallest estimated total coding cost.

27. The apparatus of claim 26, wherein the total coding cost estimating means computes a distortion metric for the block of pixels, computes a number of bits associated with coding of non-residual data of the block of pixels, and estimates the total coding cost for coding the block of pixels based on at least the distortion metric, the number of bits associated with coding of the non-residual data and the number of bits associated with coding of the residual data.

28. The apparatus of claim 9, further comprising:
means for selecting a coding mode based on at least the estimated number of bits associated with coding of the residual data;
means for quantizing the one or more transform coefficients for the residual data after selecting the coding mode;
means for encoding the quantized transform coefficients for the residual data; and
means for transmitting the encoded coefficients for the residual data.

29. The computer-program product of claim 13, wherein code for estimating the number of bits associated with coding of the residual data further comprises code for estimating a-the number of bits associated with coding of the residual data in each of at least two block modes and code for estimating the coding cost further comprises code for estimating the coding cost for each of the at least two block modes based on at least the estimated number of bits associated with coding of the residual data in the respective one of the block modes, and further comprising code for selecting one of the block modes based on at least the estimated number of bits for each of the modes.

30. The computer-program product of claim 29, further comprising:
code for estimating, for each of the modes, a total coding cost for coding the block of pixels using at least the estimated number of bits associated with coding of the residual data;
code for selecting one of the modes with a smallest estimated total coding cost; and
code for applying the selected mode to code the block of pixels.

31. The computer-program product of claim 30, wherein code for estimating the total coding cost comprises:
code for computing a distortion metric for the block of pixels;
code for computing a number of bits associated with coding of non-residual data of the block of pixels; and
code for estimating the total coding cost for coding the block of pixels based on at least the distortion metric, the number of bits associated with coding of the non-residual data and the number of bits associated with coding of the residual data.

32. The computer-program product of claim 13, further comprising:
code for selecting a coding mode based on at least the estimated number of bits associated with coding of the residual data;
code for quantizing the one or more transform coefficients for the residual data after selecting the coding mode;
code for encoding the quantized transform coefficients for the residual data; and
code for transmitting the encoded coefficients for the residual data.

* * * * *